June 2, 1936.　　　　J. A. DANIELL　　　　2,042,513

DOUBLE UNIVERSAL JOINT

Filed April 25, 1935　　　　2 Sheets-Sheet 1

Inventor
John Arthur Daniell
by Mawhinney & Mawhinney
Attorneys.

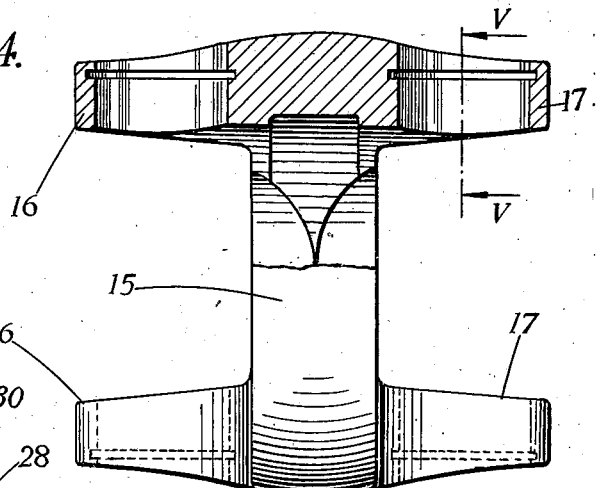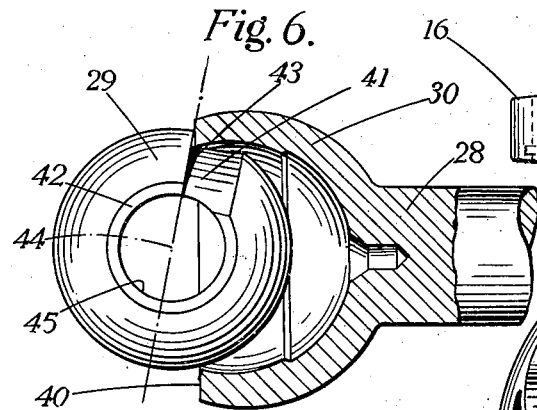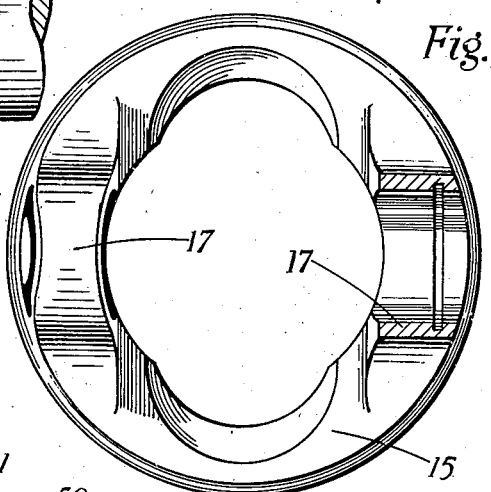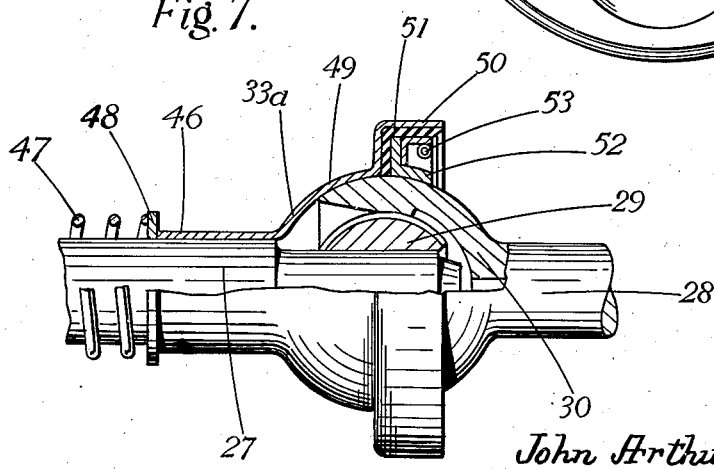

Patented June 2, 1936

2,042,513

UNITED STATES PATENT OFFICE 2,042,513

DOUBLE UNIVERSAL JOINT

John Arthur Daniell, Birmingham, England

Application April 25, 1935, Serial No. 18,248
In France May 4, 1934

8 Claims. (Cl. 64—21)

This invention relates to double universal joints, by which a drive can be transmitted at constant velocity, of the kind comprising driving and driven forks which are connected, respectively, to an intermediate yoke by coupling members, preferably through needle roller bearings, the parts being positioned by ball-and-socket means one element of which is slidable with respect to its associated fork.

The main object is to provide an improved joint of this kind which is particularly suitable for use in the driving of a steerable wheel of a motor-vehicle, though the joint may in general be used for transmitting rotary motion between any two shafts the axes of which may at times be collinear and at other times may intersect with a material angle. In particular, an important object is to provide a simple and robust construction with which the lubrication of the various parts can be ensured at all times in a very satisfactory manner.

A further object is a lubricant-containing casing enclosing the ball-and-socket means and arranged within the yoke. The casing may have socket annuli seating on ball portions carried on shafts which are in turn carried by the forks, these shafts, respectively, carrying the ball-and-socket means. In that event one of these said ball portions is slidably mounted on its shaft and spring-pressed in the appropriate direction. Alternatively, the casing may have a universal engagement with the socket exterior being slidably mounted and spring-pressed towards the socket.

A further object of the invention is to form the ball element with a peripheral recess one circumferential edge of which is adjacent a diametrical plane of the ball element; such that the latter can be entered into the socket element (the open end of which is of less diameter than the maximum diameter of the socket element) and will be held in the socket element when turned about a diametrical axis other than that at right-angles to said diametrical plane, thus to facilitate assembly.

In the accompanying drawings:—

Figure 4 is a part-sectional plan of the yoke;

Figure 5 is an elevation of the yoke taken from the left of Figure 1, one of the yoke arms being shown in section on the line V—V of Figure 4;

Figure 6 is a sectional elevation of the ball-and-socket joint to a larger scale, indicating the manner of assembly; and Figure 7 is a part-sectional elevation, also to a larger scale, indicating an alternative arrangement of casing.

Figure 1:
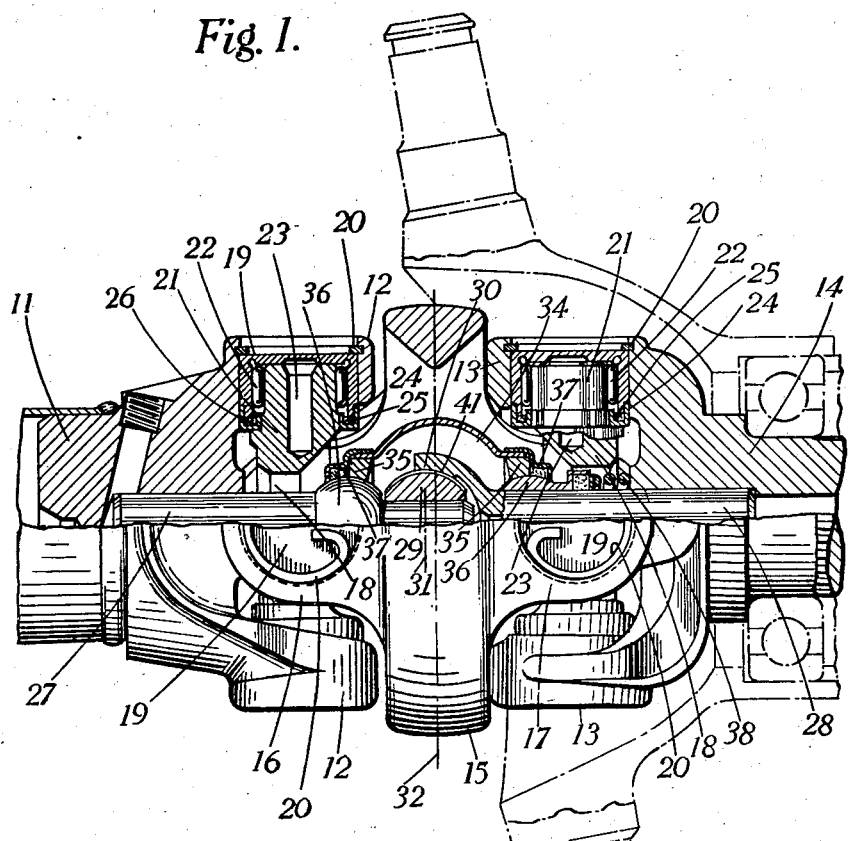
Figure 1 is a part-sectional elevation of a double universal joint, according to the invention, arranged in the drive to the front wheel of a motor-vehicle, the king pin and bearing for the driven shaft being indicated by chain lines.
Figure 2:
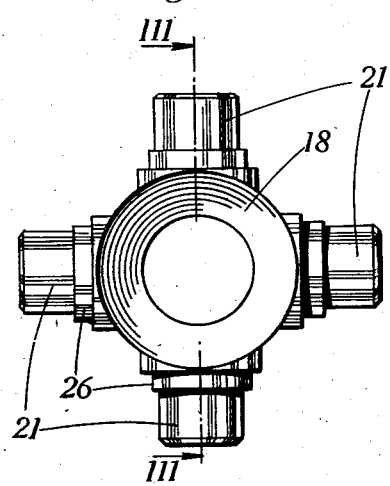
Figure 2 is an elevation, taken from the left of Figure 1, of one of the said coupling members.
Figure 3:
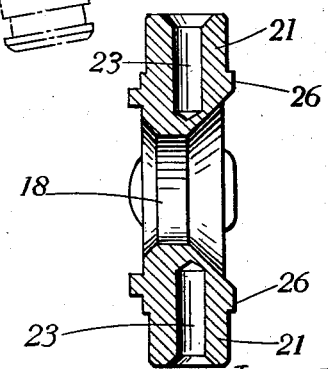
Figure 3 is a sectional elevation of this coupling member taken on the line III—III of Figure 2.

In the construction illustrated, the driving shaft 11 terminates with a fork or two arms 12, 12 which are co-planar with the arms 13, 13 of the driven shaft 14. Interposed between these two forks is the yoke 15. This is formed with a pair of arms 16, 16 which are substantially co-planar (when there is no angularity) with the arms 12 of the driving shaft and spaced at 90° therefrom, and with another pair of arms 17, 17 which are substantially co-planar (when there is no angularity) with and spaced by 90° from the arms 13 of the driven shaft. The yoke is coupled to the two forks by the coupling members 18, 18, respectively, which are substantially identical.

As will be seen, each of the arms 12, 13, 16, 17, has a through hole in it which carries a thimble 19. This is held in position in the arm by a circlip 20 arranged in a groove in the arm. It engages the adjacent trunnion 21 of the associated coupling member through roller needle bearings 22. The trunnion has an oil reservoir formed in it at 23. The space where the needle roller bearings are is closed at its inner end by the flexible annular seal 24 with an interposed cork packing 25, the seal acting, as will be seen, between a shoulder 26 formed on the coupling member and the co-acting arm.

To take the weight of the joint the driven and driving shafts are in this instance provided with shafts 27, 28, respectively, which extend through the respective coupling members. The shaft 27 has slidably mounted upon its end a ball element 29 co-acting with a part-spherical socket element 30 fast on the shaft 28. This ball-and-socket means acts for positioning the driving and driven shafts. When these are aligned the centre of the ball element, which lies on the chain line 31, is offset slightly from the centre of the yoke 15, which lies on the chain line 32, in the direction towards the driving shaft 11, i. e., towards the fork with respect to which the ball element is slidable. If the ball element were slidably mounted on the driven shaft 28 its centre, when the shafts 27, 28, are co-axial, would be offset from the centre of the yoke 15 towards the driven shaft 14. The arrangement is such that when the steerable road wheel is locked fully over, i. e., when the driving and driven shafts are inclined to one another with maximum angularity, the centre of the ball element will be substantially coincident with that of the yoke, i. e., during the locking over the ball element will move axially along the shaft 27 towards the centre of the yoke. This ensures that the double joint will work to the maximum advantage.

It is desirable that the ball-and-socket means should be well lubricated and for this purpose there is shown in Figure 1 an enclosing casing 34 arranged in the interior of the yoke. This casing, as a matter of convenience, can be built up from more than one piece, and it has at its ends socket annuli 35, 35 of bronze co-acting with ball portions 36, 36 on the shafts 27, 28, a felt or other packing 37 being arranged beyond the socket annuli within the casing 34. One of these ball portions, that arranged on the shaft 28 in this instance, is slidable thereon, being spring-pressed towards the socket by the spring 38, so that the casing can slide as necessary as the angularity of the joint varies.

It will be noted from Figure 6 that the diameter of the open end 40 of the socket element 30 is slightly less than the maximum diameter of the socket element. The ball element 29 has a peripheral recess 41 which in this instance theoretically extends for approximately 180°, though actually opposite faces of the ball element are flattened at 42, thus restricting the angular extent of the recess. One circumferential edge 43 of the recess lies in a diametrical plane of the ball element. Thus, when the ball element is arranged as shown in Figure 6, with this edge 43 in the plane of the open end of the socket element, the ball element can be entered into the interior of the socket element, the recess 41 being just deep enough to allow of this. If the ball element then be turned, for example, through a right-angle, about its diametrical axis 44, about which the circumferential edge 43 of the recess 41 is symmetrical, the ball will be held in the socket element. It will be locked in the socket element in this way if it be turned about any diametrical axis except that particular one which is perpendicular to the diametrical plane in which the edge 43 lies.

In the arrangement of Figure 1 the ball element, as stated, is slidingly carried by the shaft 27. The ball element has a through hole 45 the axis of which is in the said diametrical plane and is a diametrical chord for the circumferential edge 43 of the recess 41. When the ball element has been entered in the socket element and turned through 90° about the axis 44, the axis of its hole 45 is collinear with the main axes of the shafts 27, 28 (assuming that these are co-axial), and the former shaft can then be entered into the hole 45 in the ball element, as shown in Figure 1, whereby the ball element is locked in the socket element.

In the modification of Figure 7 a casing 33a for the ball-and-socket means is formed as a one-piece pressing with a cylindrical portion 46 mounted on a cylindrical portion of the shaft 27, and a helical spring 47 is arranged to act against the driving fork 12 and a washer 48 at the end of the casing to force the spherical portion 49 of the latter into contact with the outer periphery of the socket element 30. The casing is in practice filled with lubricant and the offset end 50 of the casing contains a leather or other jointing washer 51 held in position in any convenient manner, as by means of a parti-spherical ring 52 clamped in position by the parts 53.

In this way a very simple and robust double universal joint can be manufactured which can be kept well lubricated and will be capable of giving useful service over a very long period.

What I claim as my invention and desire to secure by Letters Patent of the United States is:—

1. A ball-and-socket joint where the ball element has a part-spherical engagement with the socket element, the socket element having an open end of a diameter less than the maximum diameter of the socket element, the ball element having a peripheral recess one circumferential edge of which is adjacent a diametrical plane of the ball element, such that the latter can be entered into the socket element and when turned about any diametrical axis other than that which is at right-angles to the said diametrical plane will be held in said socket element.

2. A ball-and-socket joint where the ball has a part-spherical engagement with the socket element, the socket element having an open end of a diameter less than the maximum diameter of the socket element, the ball element having a peripheral recess one circumferential edge of which is adjacent a diametrical plane of the ball element, such that the latter can be entered into the socket element and when turned about any diametrical axis other than that which is at right-angles to the said diametrical plane will be held in said socket element, said ball element being an annulus with its main axis forming a diameter of said diametrical plane, and a shaft entering the opening of the ball element to lock it in position in the socket element.

3. The combination with two shafts, of co-acting ball-and-socket elements carried by the shafts, respectively, the socket element terminating with an opening of a diameter which is less than the maximum diameter of the socket element, the ball element having a peripheral recess one circumferential edge of which is adjacent a diametrical plane of the ball element such that the ball can be entered into the socket element, the ball element also having a through hole the main axis of which lies in the said diametrical plane to receive the end of the associated shaft when the ball element has been entered into the socket element and turned through a right-angle to align the hole of the ball element with the main axis of the socket element, whereby the ball element will be held in the socket element.

4. In a universal joint, the combination of a plurality of pairs of swivelly-connected members, an intermediate yoke having operative pivotal connections with corresponding members of said pairs, shafts carried by other corresponding members of said pairs, said shafts extending towards one another, a ball element carried by one of said shafts, a socket element carried by the other, said ball-and-socket elements having a part-spherical engagement with one another and one of said elements being slidably mounted upon its shaft, and a casing enclosing said ball-and-socket elements, said casing being slidably mounted and spring-pressed axially.

5. In a universal joint, the combination of a plurality of pairs of swivelly-connected members, an intermediate yoke having operative pivotal connections with corresponding members of said pairs, shafts carried by other corresponding members of said pairs, said shafts extending towards one another, a ball element carried by one of said shafts, a socket element carried by the other, said ball-and-socket elements having a part-spherical engagement with one another and one of said elements being slidably mounted upon its shaft, a casing for enclosing said ball-and-socket elements, said casing having part-spherical socket portions, ball portions mounted on said shafts in engagement with said part-spherical socket portions, and means urging one of said ball portions axially towards said ball-and-socket elements.

6. In a universal joint, the combination of a plurality of pairs of swivelly-connected members, an intermediate yoke having operative pivotal connections with corresponding members of said pairs, shafts carried by other corresponding members of said pairs, said shafts extending towards one another, a ball element carried by one of said shafts, a socket element carried by the other, said ball-and-socket elements having a part-spherical engagement with one another and one of said elements being slidably mounted upon its shaft, a casing for enclosing said ball-and-socket elements, said casing having a cylindrical portion slidably mounted on the shaft carrying said ball element and having a part-spherical portion, said socket element having a part-spherical outer periphery engaged by the part-spherical portion of said casing, and a spring urging said casing axially towards said ball-and-socket elements.

7. In a joint of the character described, the combination of a pair of connected universal joints, centering means for said joints comprising cooperating ball-and-socket members, a sealing device enclosing said centering means and mounted thereon, said sealing device having at least a portion thereof slidable axially of the centering means, and a spring normally resisting such sliding movement of the sealing device.

8. In a joint of the character described, the combination of a pair of connected universal joints, centering means for said joints comprising members extending toward each other from the respective joints and having cooperating ball-and-socket parts, a metallic sealing shell enclosing the ball-and-socket parts and having its ends supported respectively on said members, one end of the shell being slidable relative to its supporting member, and a spring resisting such sliding movement.

JOHN ARTHUR DANIELL.